Nov. 8, 1949         R. T. SNOW         2,487,194
DRAIN VALVE
Filed March 2, 1944         2 Sheets-Sheet 1
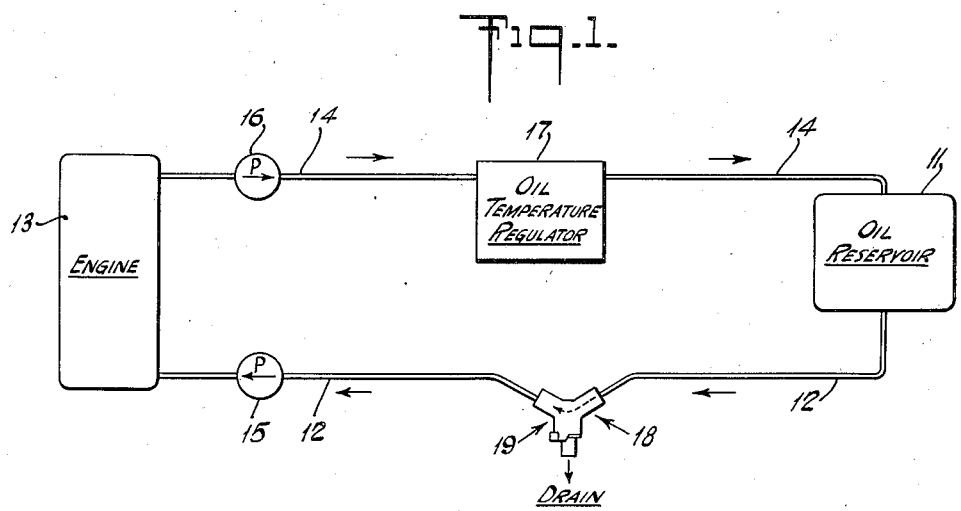
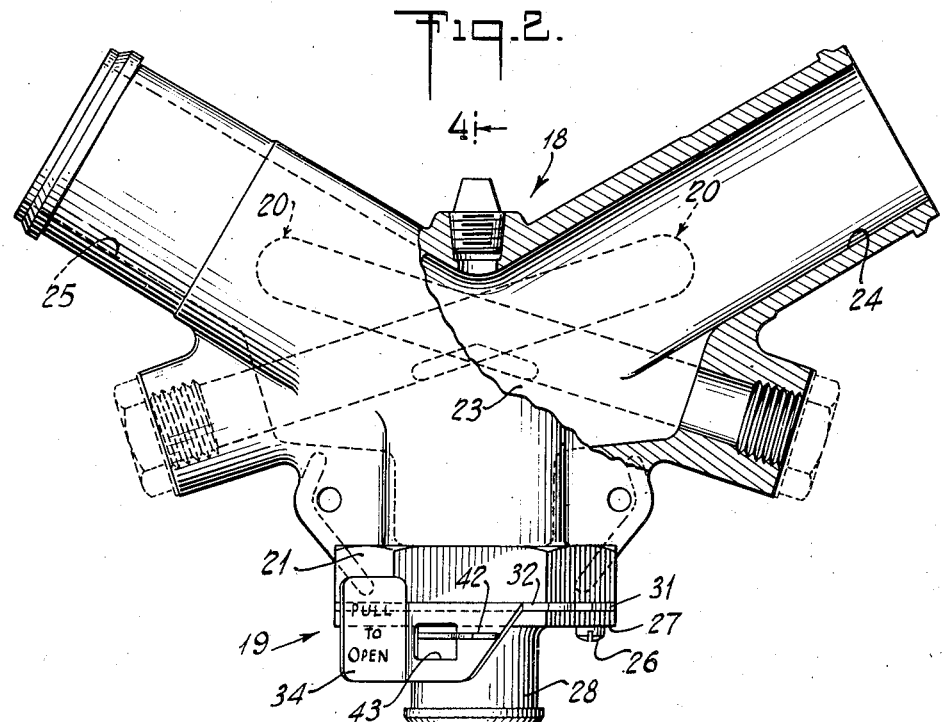
INVENTOR
ROBERT T. SNOW.
BY
C. B. Stevens
ATTORNEY

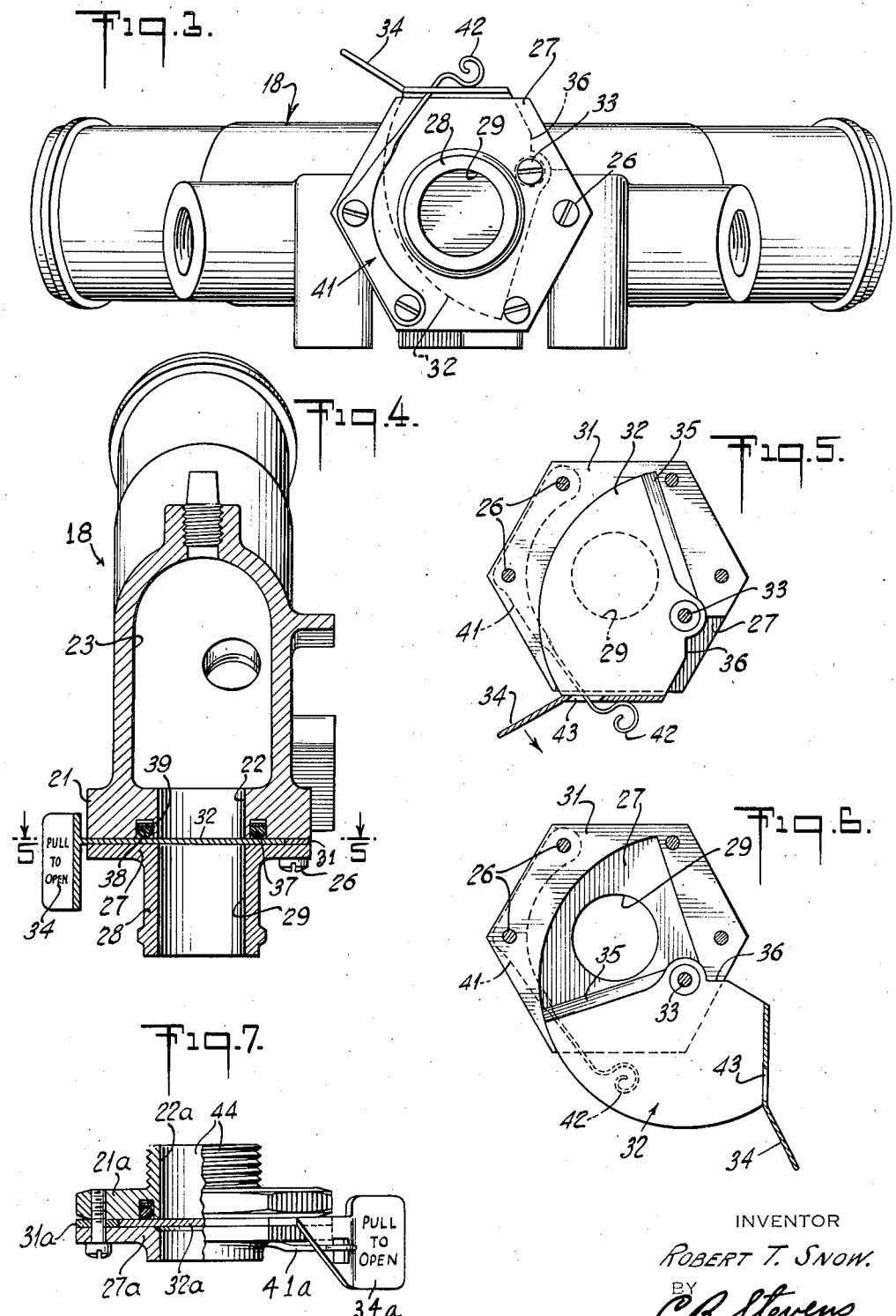

Patented Nov. 8, 1949

2,487,194

UNITED STATES PATENT OFFICE 2,487,194

DRAIN VALVE

Robert T. Snow, Van Nuys, Calif., assignor to United Aircraft Products, Inc., Dayton, Ohio, a corporation of Ohio Application March 2, 1944, Serial No. 524,758

7 Claims. (Cl. 251—18)

1

This invention relates to drains, and particularly to devices of that class as used in aircraft engine lubrication systems and the like in the drawing off of oil for purposes of sampling or replacement.

As so employed a drain is comprised in a fitting interposed in a line of the lubrication system; the fitting including a chamber communicating with the line, a passage connecting the chamber to the place of drain, and a valve controlling the flow of fluid through the passage. Heretofore the control valve has been of the rotary plug type or of the poppet type, and in either case presents features of disadvantage. In the former instance the valve is not readily accessible for turning because of the necessity for lockwiring it in closed position, and the size of the drain opening is limited in accordance with the dimensions of the valve. In the case of a poppet type valve a quick full flow drain is obtained but at the cost of an increase in the number of parts and consequent greater complexity of structure and operation. The present invention contemplates a fitting in which a new means of drain control is provided, involving the use of a plate or disc valve which is moved into and out of the drain passage as a slide, the arrangement preferably being one permitting a simple swinging motion of the valve to and from a position closing the drain valve to the passage of fluid therethrough. There thus is presented a valve obtaining the high flow characteristics of a poppet type drain valve in a more facile and efficient manner.

An object of the invention is to obtain a drain fitting which is superior to those of the prior art in the matters of ease of operation and simplicity of construction.

Another object is to produce a drain valve of general utility.

A further object of the invention is to associate a ring seal with a swinging disc or plate type valve in a manner inhibiting the flow of fluid along the surface of the valve.

Still another object of the invention is to prevent damage to the seal by operating movement of the valve.

Other objects and structural details of the invention will appear from the following description when read in connection with the accompanying drawings, wherein:

Fig. 1 is a diagram of an aircraft engine lubrication system, embodying a drain fitting constructed in accordance with the present invention;

2

Fig. 2 is a view of the drain fitting in front elevation, part of the body thereof being broken away;

Fig. 3 is a bottom plan view of the drain fitting;

Fig. 4 is a view in vertical longitudinal section along the line 4—4 of Fig. 2;

Fig. 5 is a view in cross section along the line 5—5 of Fig. 4, showing the valve in a position closing the drain passage;

Fig. 6 is a view similar to Fig. 5, showing the valve swung to a position opening the drain passage, and Fig. 7 is a view in front elevation, partly broken away, of a modified form of drain fitting.

Referring to Fig. 1, an aircraft engine lubrication system comprises an oil reservoir or tank 11, a supply line 12 leading from the reservoir to an engine 13, and a return line 14 extending from the engine back to the reservoir. During operation of the engine the oil is circulated continuously to and from the engine, such circulation being effected by positive means represented by two engine driven pumps 15 and 16 disposed respectively in lines 12 and 14. The pump 15 withdraws oil from the reservoir 11, causing it to flow through supply line 12 and be forcibly fed to the engine bearings and centers of lubrication. The pump 16, which may be termed the scavenge pump, directs oil leaving the engine back to the reservoir for storage and re-use.

There may be further comprised in the engine lubrication system elements of control and regulation. Thus in the return line 14 is an oil temperature regulator 17 which conditions the heated oil emerging from the engine before its return to the reservoir.

The path of circulation of the oil through the system is open, and when it is desired to withdraw oil from the system such path may be drained through a fitting 18 in the supply line 12. Referring also to Fig. 2, the fitting 18 is a hollow body of generally Y-shape, the divergent arms of the Y being connected to branches of the line 12, and adapted to receive thermometer bulbs 20, which maintain a continuous check on the temperature of the oil. The vertical trunk portion of the Y-shaped fitting 18 is open to the atmosphere and provides means for attachment of a hose line (not shown) leading to a suitable place of drain. Within the vertical trunk portion of the fitting 18 is a valve means 19. Operable to control the flow of oil thereby, the valve means 19 is adjustable alternatively to connect and disconnect the engine lubrication system and the place of drain. With the valve means in closed position and the engine 13 running, the oil drawn from reservoir 11 flows through line 12 and into fitting 18 by way of one arm thereof and out of the fitting by way of the other arm. Access to the drain through the vertical trunk of the fitting is under those circumstances denied by the closed valve means 19.

In further consideration of the drain fitting 18, it preferably is cast integrally and is formed with a thickened annular base flange 21 in which is a longitudinal bore 22 (see also Figs. 3 and 4). The inner end of the bore 22 communicates with a central chamber 23 in the fitting, which chamber lies between and connects bores 24 and 25 in respective arms of the fitting. Secured to the base flange 21 by bolts 26 is a base extension 27 including a tubular projecting portion 28 adapted for the attachment of a hose or like means for conveying the oil to the place of drain. A longitudinal bore 29 in the extension 27 registers with the bore 22 in base 21 and acts as a continuation thereof.

The inner end of the extension 27 is flanged for cooperation with the base 21 and there is interposed between the base and the flanged end of the extension a spacing element 31. As seen especially in Figs. 5 and 6, the spacing element 31 has a segmental shape, partly surrounding the central opening defined by the registering bores 22 and 29, and is held immovable by the passage therethrough of the bolts 26. The clamping of the element 31 between the extension 27 and base 21 creates a central space or slideway which is occupied by a plate 32 constituting the valve. The bolts 26 are located outside the periphery of the plate 32, but a bolt 33 extends upward into the base flange 21 adjacent one end of the spacing element 31 and passes through the plate to provide a pivot therefor. The plate 32 has a sliding fit between base 21 and extension 27 and extends outside those elements where it is formed with a finger-piece 34. Through manipulation of the finger-piece 34 the plate 32 may be oscillated about the pivot 33 and moved to a variety of rotative positions relatively to the drain opening represented by the bores 22 and 29. Extremes of movement of the plate are defined by the spacing element 31 which is abutted by an edge 35 of the plate in one extreme position (see Fig. 5) and by a shoulder 36 of the plate in the other extreme position (see Fig. 6). In the former of its extreme positions the plate 32 entirely covers the bore 29 and thereby effectually closes the drain passage against the escape of oil from the fitting. In moving from closed position the plate 32 uncovers a portion or all of the bore 29, allowing a flow of oil from the fitting.

As a seal against the seepage of fluid along the plate 32 there is utilized a ring seal 37 contained in an annular recess 38 in the base 21. The recess 38 surrounds the bore 22 and further contains, in back of the seal 37, a spring 39. In the closed position of the plate 32 under the pressure of the spring 39, the seal 37 engages an annular area on the upper surface of the plate with a fluid tight contact which confines the oil in the fitting. In moving the plate 32 from closed position a part of the seal 37 is uncovered and it tends to drop slightly from its position in the recess 38. Accordingly when the plate returns to closed position the edge 35 thereof acts on the seal with something of a camming action, pressing it back into the recess 38. In order that no sharp edges may be present to cut and damage the seal, the plate is given a slope or bevel at edge 35.

To insure against accidental dislodgement of the drain valve from closed position, it may be held closed by latching means. An easily releasable spring catch is here disclosed for that purpose, and takes the form of a segmental part 41 bolted to the underside of the flanged head on extension 27. The catch itself projects as a spring steel extension outward into cooperative relation with the bent over ear 34 on plate 32, the curved outer end or head 42 of the catch being adapted to pass through an opening 43 in the ear 34 and exert pressure on the ear in a direction to urge the plate 32 to closed position.

When it is desired to initiate a draining operation the finger piece on ear 34 is grasped, and at the same time the spring catch 41 is bent outward until the head 42 may pass through the opening 43. Thereupon the plate 32 may be pulled or swung about the pivot 33 from the position shown in Fig. 5 toward the position shown in Fig. 6, and in the course of such movement the bore 29 is opened and draining commenced. In returning the plate valve to closed position, one side of the ear 34 engages the head 42 of the spring catch 41 adjacent the opening 43, whereupon the head is forced into alignment with the opening, and, passing therethrough re-engages the ear on its opposite side.

The invention has been disclosed in connection with the Y drain fitting of an aircraft engine lubrication system, but it will be understood that other embodiments are possible. Thus in Fig. 7 there is shown a unit of general utility which may be mounted in the line of any fluid system. Referring to Fig. 7, it will be seen that the annular flange 21 of the previous embodiment is in this instance a separate part 21a. A short tubular pipe adapter 44 extends upward from the part 21a in registry with the bore 22a. The adapter 44 is adapted to be inserted in a selected complementary opening in the fluid system, and its outer surface preferably is screw threaded as a means of attachment. The utility unit further includes an extension 27a, a spacing element 31a and a plate valve 32a all constructed and arranged in a manner the same as or similar to that of the corresponding parts in Figs. 1 to 6. As indicated in Fig. 7, the hose connector on extension 27—27a may be omitted in installations not requiring remote disposal of the fluid.

The unit of Fig. 7 is adaptable to a variety of uses. In general it is intended that it should replace plugs conventionally used in drain openings. Such plugs cannot be removed without the use of special tools and often are a source of trouble since they stick when the drain is infrequently used and are subject to breakage. Substitution therefor of a fixture according to the present invention insures quick, easy draining and trouble free operation at the cost of very slight additional weight increase.

What is claimed is:

1. A drain fitting for use in fluid circulating systems and the like, comprising a body having a bore opening through one end thereof, a body extension secured to said body in spaced relation thereto and formed with a bore constituting a continuation of the bore in said body, an imperforated plate valve mounted between said body and body extension for sliding movement into and out of position between said bores whereby to prevent and to permit fluid flow through said bores, an annular recess in said body surrounding said bore, a sealing assembly comprising a spring and a ring seal contained in said recess, the thickness of the ring seal being at least as great as the thickness of said plate valve and at least as great as the space within which the plate valve is slidable, said spring pressing said seal into surface contact with said plate valve in the flow preventing position of said valve and tending to displace said seal from said recess in the flow permitting position of said valve, the surface of said body extension and adjacent said plate valve being so positioned below said ring seal as to serve as a stop therefor and prevent complete expulsion of the ring from said annular recess and a cam surface on said plate valve for returning said seal into said recess in response to motion of said valve to flow preventing position.

2. A drain fitting for use in fluid circulating systems and the like, comprising a body having a bore opening to the exterior thereof, a body extension having a bore therethrough constituting a continuation of the bore in said body, a segmental spacer element between said body and body extension embracing the area of said bores and defining a slideway in said area, an imperforate plate valve arranged in said slideway and movable into and out of a position cutting off flow through said bores, an annular recess in said body surrounding the bore therein, and a sealing assembly in said recess including a spring and a ring seal, said spring urging said seal having a thickness at least as great as the thickness of said plate valve and at least as great as the space within which the plate valve is slidable outward from said recess toward sealing contact with said plate valve, the surface of said body extension and adjacent said plate valve being so positioned below said ring seal as to serve as a stop therefor and prevent complete expulsion of the ring from said annular recess.

3. A drain fitting according to claim 2, characterized by a cam surface on said plate valve operative during motion of the plate toward flow cut-off position to compress said ring seal into said recess against the urging of said spring.

4. A drain fitting for use in fluid circulating systems and the like, comprising complementary flanged elements in end to end relation, registering bores in said elements defining a fluid passage through the fitting, a segmental spacer between said elements embracing the port area of said elements and defining a slideway in said area, connecting bolts passed through the flanges of said elements and through said spacer, an imperforate plate valve movable in said slideway into and out of a closing position between said registering ports, an annular recess in one of said elements surrounding the port therein, and a ring seal in said recess adapted to make a surface contact with said plate valve to inhibit escape of fluid therealong.

5. A drain fitting for use in fluid circulating systems and the like, comprising a body having a bore opening to the exterior thereof, an imperforate plate valve movable radially of said bore to control the flow of fluid therethrough, means defining a slideway for said valve, an annular recess in said body facing said slideway, a ring seal in said recess adapted to engage said plate valve to inhibit the escape of fluid from said bore therealong, the thickness of said ring seal being at least as great as the thickness of said plate valve and at least as great as the space within which the plate valve is slidable, and a spring in said recess in back of said seal urging said seal into contact with said plate valve, a surface of said slideway being so positioned below said ring seal as to serve as a stop therefor and prevent complete expulsion of the ring from said annular recess.

6. A drain fitting for use in fluid circulating systems and the like, comprising complementary flanged elements in end to end relation, registering ports in said elements defining a fluid passage through the fitting, a segmental spacer between said elements embracing the port area of said elements and defining a slideway in said area, one side of which is arcuate in shape, connecting bolts passed through the flanges of said elements and through said spacer, an imperforate plate valve movable in said slideway into and out of closed position between said registering ports, said valve having a shape complementing the shape of said slideway as definied by said segmental spacer, a pivotal mounting for said plate valve providing for an oscillating motion of said valve into and out of closed position, an annular recess in one of said elements surrounding the port therein, a sealing assembly in said recess including a spring and a ring seal, said spring urging said seal outward from said recess toward sealing contact with said plate valve, the other of said elements presenting a surface so positioned below said ring seal as to serve as a stop therefor and prevent complete expulsion of the seal from said annular recess, the thickness of said ring seal being at least as great as the thickness of said plate valve and at least as great as the space within which the plate valve is slidable.

7. A drain fitting according to claim 6, characterized by a spring mounted on one of said flanged elements and cooperative with said plate valve whereby yieldingly to hold said valve in closed position.

ROBERT T. SNOW.

REFERENCES CITED

The following references are of record in the file of this patent:

UNITED STATES PATENTS

| Number | Name | Date |
|---|---|---|
| 1,324,990 | Weber | Dec. 16, 1919 |
| 1,490,150 | Wagner | Apr. 15, 1924 |
| 1,554,086 | Haller | Sept. 15, 1925 |
| 1,607,827 | Hermmann | Nov. 23, 1926 |
| 1,608,637 | Vincent | Nov. 30, 1926 |
| 1,619,956 | Renehan | Mar. 8, 1927 |
| 1,717,471 | Spencer | June 18, 1929 |

FOREIGN PATENTS

| Number | Country | Date |
|---|---|---|
| 17,246 | Great Britain | Sept. 11, 1894 |
| 159,967 | Great Britain | 1921 |
| 324,654 | Germany | Aug. 31, 1920 |
| 553,051 | France | Feb. 2, 1923 |